United States Patent [19]

Rose

[11] 4,152,262
[45] May 1, 1979

[54] FILTRATION AND PURIFICATION APPARATUS

[76] Inventor: Jack G. Rose, 1935 SE. Washington, Milwaukee, Oreg. 97222

[21] Appl. No.: 877,075

[22] Filed: Feb. 13, 1978

[51] Int. Cl.$^2$ .......................................... B01D 27/08
[52] U.S. Cl. .................................. 210/136; 210/206; 210/257 R; 210/260; 210/501
[58] Field of Search .............. 210/169, 198, 205, 206, 210/282, 136, 257, 260, 501; 23/267 F, 272.7, 272.8

[56] References Cited

U.S. PATENT DOCUMENTS

| | | | |
|---|---|---|---|
| 2,869,926 | 1/1959 | Lundquist | 23/272.7 |
| 3,342,335 | 9/1967 | Gamundi et al. | 210/282 X |
| 3,342,340 | 9/1967 | Shindell | 210/282 |
| 3,419,360 | 12/1968 | Rak | 23/272.7 |
| 3,474,817 | 10/1969 | Bates et al. | 23/272.8 |
| 3,595,397 | 7/1971 | Abos | 210/282 |
| 3,595,399 | 7/1971 | Abos | 210/282 |
| 3,655,054 | 4/1972 | Ponsini | 23/272.7 |
| 3,864,090 | 2/1975 | Richards | 23/272.8 |
| 3,950,253 | 4/1976 | Stem | 210/282 |
| 4,059,522 | 11/1977 | Polley et al. | 210/169 |

Primary Examiner—Theodore A. Granger
Attorney, Agent, or Firm—Francis X. LoJacono

[57] ABSTRACT

A filtration and purification apparatus for use in water lines of both domestic and industrial applications, wherein water must be purified and filtered prior to use—particularly with respect to human consumption thereof. The filter/purifier comprises a housing having an inlet port which discharges into a filter chamber, wherein the incoming water passes through a filter member into an adjacent metering compartment which controls the flow of water both through an outlet port and a communicating purifying chamber, the purifying chamber including a predetermined amount of iodine crystals stored therein. Water enters the purifying chamber from the metering compartment and discharges into a mixing compartment which is interposed between the purifying chamber and the outlet port, and the metering compartment and the outlet port, wherein the iodine-treated water is mixed with the filtered water that passes through a flow-control port disposed between the mixing compartment and the metering compartment, thereby allowing filtered and purified water to pass through the outlet port for use.

14 Claims, 10 Drawing Figures

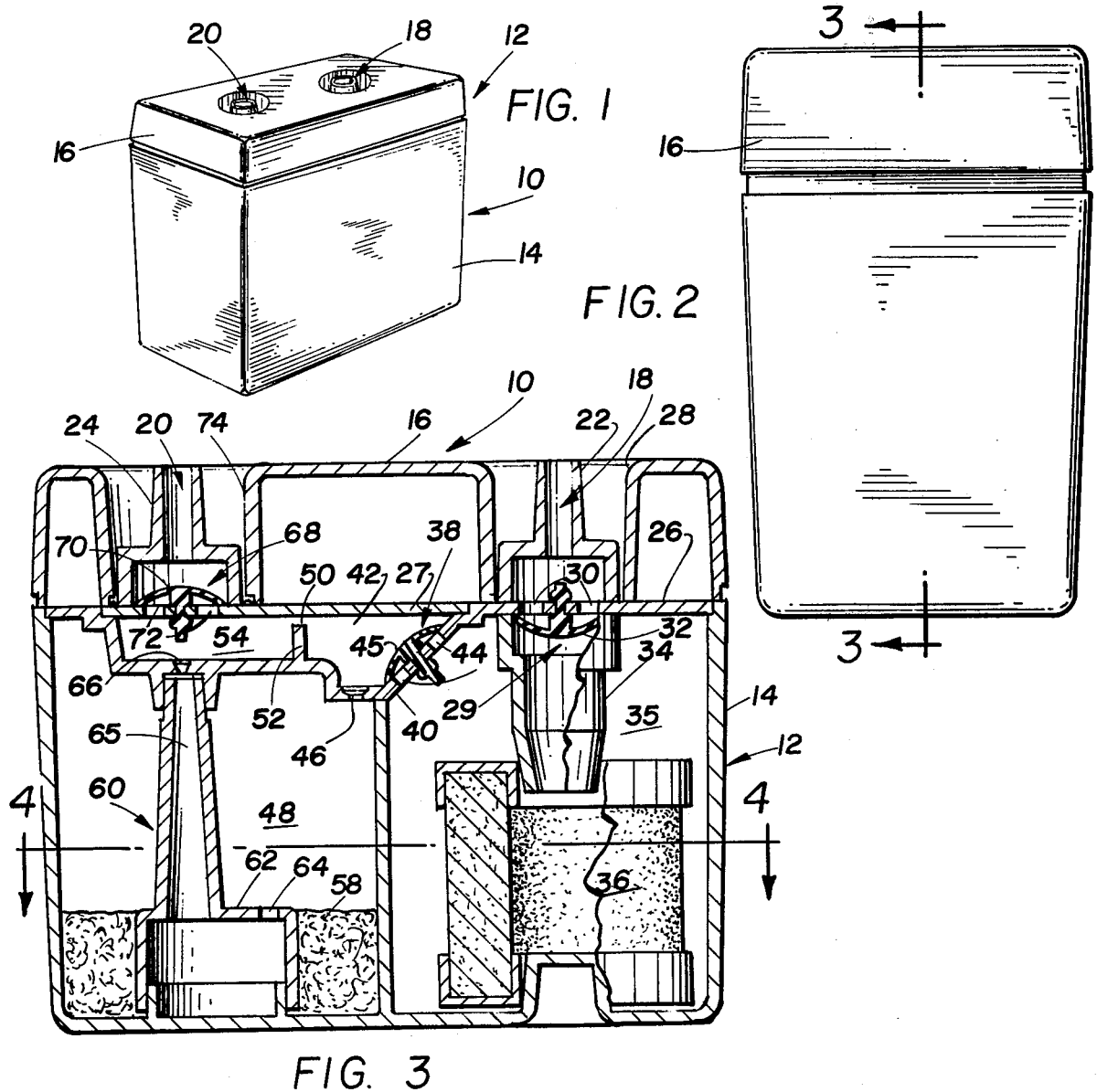
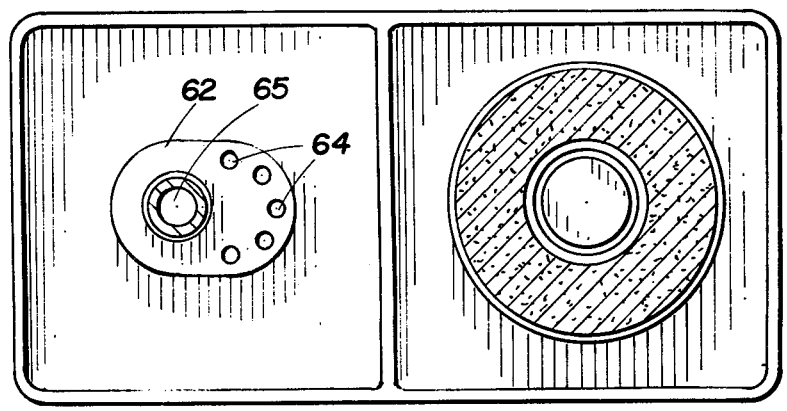

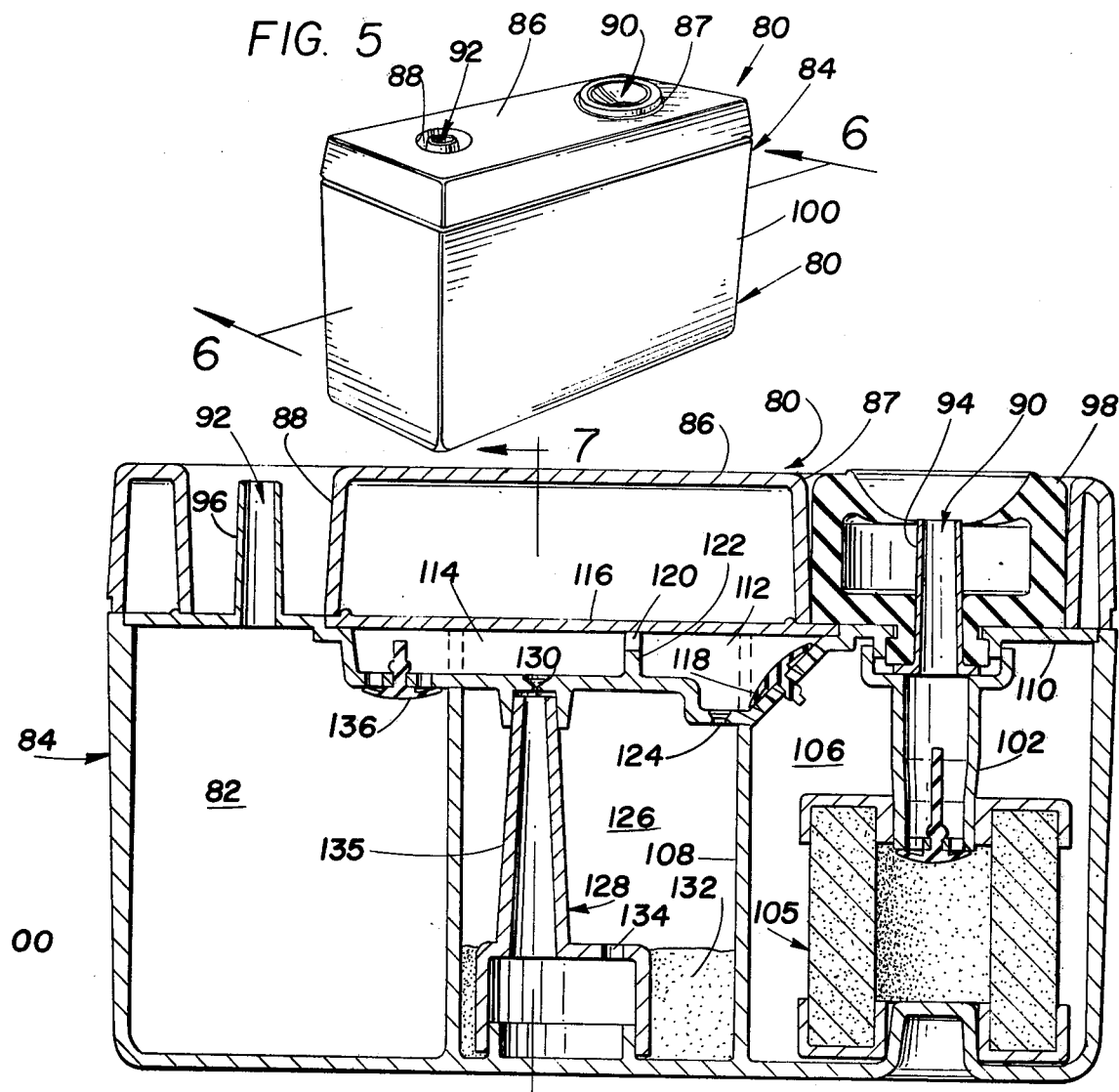

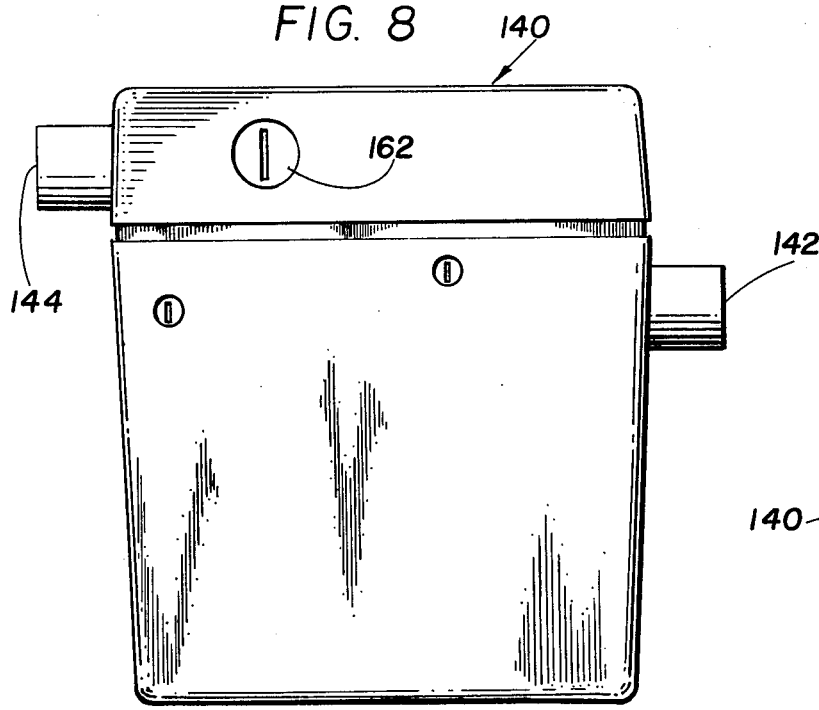
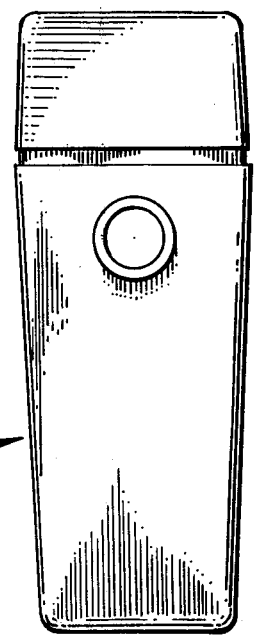
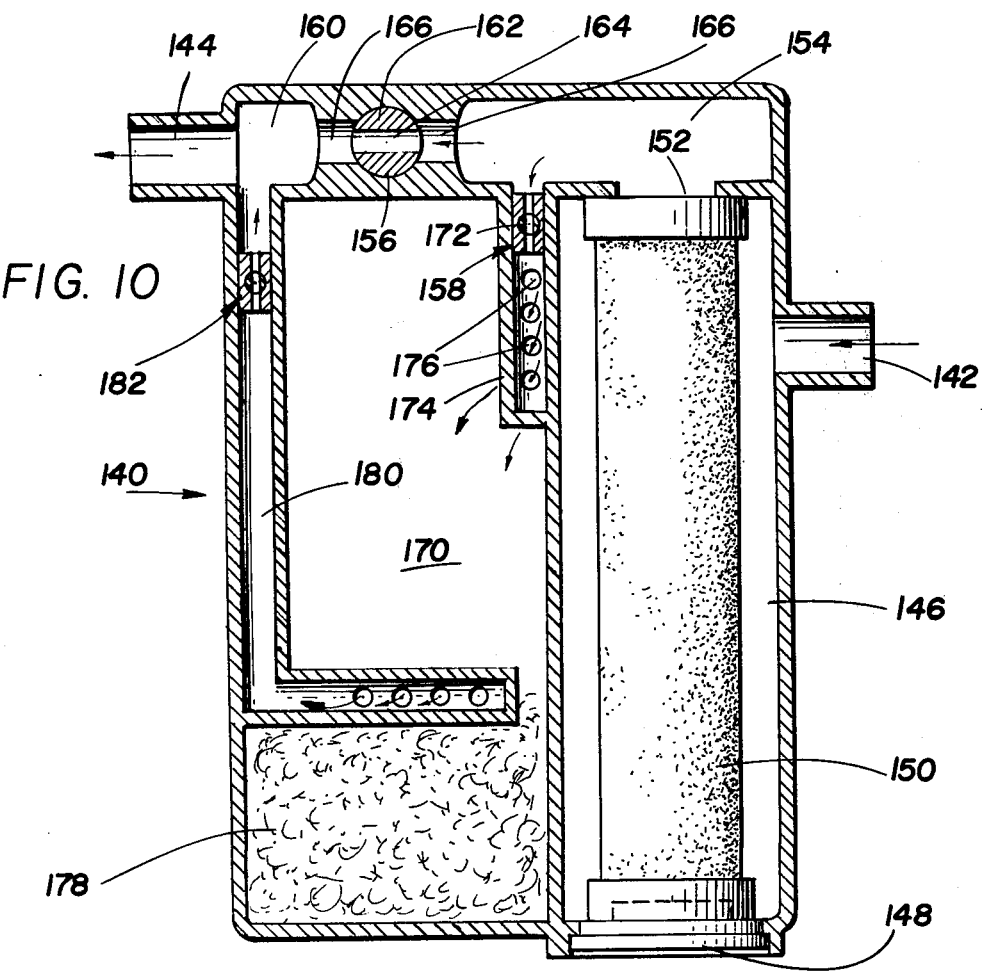

FILTRATION AND PURIFICATION APPARATUS

BACKGROUND OF THE INVENTION

1. Field of the Invention

This invention relates to an apparatus that is adapted to both filter and purify water, wherein the apparatus is arranged to be located in a water-flow system or attached to existing water faucets as a portable device.

2. Description of the Prior Art

As is well known in the art, various problems and difficulties are encountered in providing suitable means for filtering and purifying water in a simple and inexpensive manner.

Various types of purifying and filtering units and devices are used to provide drinkable water. However, these devices have features that restrict their use; and they are complicated to operate and expensive to maintain.

SUMMARY OF THE INVENTION

The present invention comprises a housing having an inlet port and an outlet port, the ports being adapted either to be connected directly into a water system or connected to a water-system-outlet faucet, whereby the apparatus is used as a portable water filter/purifier unit. The inlet allows water to enter a filtering chamber by way of a check valve. The water passes through a filter member and then discharges from the filter chamber into a metering compartment which is also provided with a check valve. The metering compartment is positioned to communicate with both a mixing compartment and a purifying chamber, whereby filtered water is directed from the metering compartment into both the purifying chamber and the mixing chamber. The controlled and mixed amount of water is discharged through the outlet of the housing; and at this time, the water therefrom is safe to drink without any known pathogenic organisms, due to the device which uses iodine crystals for its purifying control.

Thus, this device is adapted to be installed in various ways—such as connected to a water faucet, positioned in a water line just before the water faucet (under a sink), within the main incoming water line of a building wherein all water lines within a building are supplied with filtered/purified water.

OBJECTS AND ADVANTAGES OF THE INVENTION

The present invention has for an important object to provide a combination water filter and purifier that is capable of being used in permanent installations, as well as being used as a portable unit for various types of installations heretofore not possible with other known devices.

It is another object of the invention to provide a water filter/purifier that incorporates the use of iodine crystals as a germicidal that can be maintained at 0.80 ppm to 1.2 ppm.

It is still another object of the invention to provide a filter/purifier that is a self-contained, sealed unit which can provide 100,000 gallons of filtrated/purified water free of any known pathogenic organisms at a flow rate of two to seven gallons per minute.

It is a further object of the present invention to provide an apparatus of this character that includes an activated carbon filter for removal of odor and taste.

It is still a further object of the invention to provide a device of this character that is easy to install and maintain.

Still another object of the invention is to provide a a device of this character that is relatively inexpensive to manufacture.

It is still a further object of the invention to provide a water filter and purifier that is simple and rugged in construction.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or modes of operation that are properly within the scope of the appended claims.

BRIEF DESCRIPTION OF THE DRAWINGS

Referring more particularly to the accompanying drawings, which are for illustrative purposes only:

FIG. 1 is a perspective view of one form of the present invention;

FIG. 2 is an enlarged end view thereof;

FIG. 3 is a cross-sectional view taken substantially along line 3—3 of FIG. 2;

FIG. 4 is a cross-sectional view taken substantially along line 4—4 of FIG. 3, showing the adjacent filter chamber and purifying chamber;

FIG. 5 is a perspective view of a second form of the present invention, wherein a storage chamber is provided therein;

FIG. 6 is an enlarged, cross-sectional view taken substantially along line 6—6 of FIG. 5;

FIG. 7 is a cross-sectional view of the purifying chamber taken along line 7—7 of FIG. 6;

FIG. 8 is a front-elevational view of an alternative arrangement of the present invention;

FIG. 9 is a side-elevational view thereof; and

FIG. 10 is a diagrammatic, cross-sectional view thereof.

DESCRIPTION OF THE PREFERRED EMBODIMENT

Referring more particularly to FIGS. 1 through 4, there is shown a water-filter and purifying apparatus, generally designated at 10, formed by a housing 12 having a lower body 14 and an upper body 16 wherein the two bodies define sealed housing 12. The upper body 16 is fixedly attached to lower body 14, and includes therein an inlet port 18 and an outlet port 20. Several arrangements and forms are contemplated for inlet 18 and outlet 20; and they are herein shown as having nipple members 22 and 24, respectively. Thus, various known hose or pipe attachments can be provided to allow water to flow through inlet port 18 and discharge from outlet 20. Interposed between upper body 16 and lower body 14 is a horizontal wall member 26 affixed to the peripheral edge of body 14.

Accordingly, nipple 22 is positioned in recess 28 of upper body 16 and secured to wall 26 directly over a one-way valve means 29 defined by a plurality of holes 30 formed in wall 26, and including a valve cap member 32 adjacent the underside of wall 26. Thus, water is allowed to pass in one direction only—that being downwardly through nozzle 34 which extends into the filter chamber 35, wherein a filter means 36 is positioned to receive water directly from nozzle 34, causing the water to pass through filter 36 and exit through a second one-way valve means 38. Valve means 38 is disposed in a partition 40 which separates filter chamber 35 from a metering compartment 42. Again, valve means 38 includes a plurality of holes 44 and a valve-cap member 45, through which filtered water enters metering compartment 42 defined by wall 26 and panel 27.

Metering compartment 42 further includes a metered orifice 46 to provide a flow-through connection to purifying chamber 48, and a metered flow means 50 disposed in partition 52 positioned between metering compartment 42 and mixing compartment 54, metering means 50 being shown as a predetermined size opening.

Purifying chamber 48 is separated from filtering chamber 35 by wall 56 which is sealed against the underside of metering compartment 42, as seen in FIG. 3. Disposed and sealed within purifying chamber 48 are a germicidal element 58, which is preferably a predetermined quantity of iodine crystals and a restricted conduit means 60, the conduit means being so constructed as to compress a drum-like base member 62 having a plurality of apertures 64 formed therein to allow iodized water to enter conduit 60 and discharge up through tubular neck member 65. From neck member 65, the iodine-treated water passes through a metered orifice 66 disposed in the bottom of mixing compartment 54.

Accordingly, filtered water from metering compartment 42 mixed with the iodized water from purifying chamber 48, whereby the metered openings from each chamber and compartment allow for the proper mixture to occur in the mixing chamber prior to being forced through valve means 68 disposed adjacent outlet 20. That is, valve means 68 comprises a valve-cap member 70 which covers a plurality of openings 72 that allow purified and filtered water to be discharged through outlet nipple 24, as seen in FIG. 3. At this time, the water is fit for human consumption, having a determined residual iodine of 1.0 ppm to 1.2 ppm.

Nipple member 24 is thus positioned directly over mixing compartment 54 and positioned within a second recess 74 formed in upper body 16. Hence, various types of connecting hoses can be provided to couple with nipple members 22 and 24.

In this particular arrangement of the present invention, one can readily carry a single unit while traveling from country to country and be assured of pure filtered drinking water.

Referring now to the alternative embodiment as shown in FIGS. 5 through 7, there is illustrated a combination water filter and purifier, generally indicated at 80, which is provided with an additional storage compartment, indicated at 82. Thus, the basic filtering and purifying principles are provided herein having the elements thereof in a slightly different arrangement, wherein the housing 84 comprises an upper body 86 having recesses 87 and 88, in which inlet 90 and outlet 92 are respectively disposed. Inlet 90 is defined by nipple member 94, and outlet 92 is defined by nipple member 96. Nipple member 94 includes a rubber coupling member 98 in which any suitable discharge connection is readily received therein. That is, if necessary, a water faucet can be forced over nipple member 94 and be temporarily sealed thereto to allow unpurified water to enter into the lower body 100 of housing 84. Hence, the water passes from nipple 94 through nozzle 102 having a valve means 104 mounted thereto, the valve 104 being positioned within filter means 105 formed by any suitable known filter material constructed as a cartridge, wherein filter 105 and nozzle 102 are positioned within filtering chamber 106, said chamber being defined by walls of housing 100, partition wall 108, and horizontal wall member 110 through which nipple 94 projects.

As in the first embodiment, wall member 110 is formed having a depressed portion wherein a metering compartment 112 and an adjacent mixing compartment 114 are defined, together with cover plate 116.

Metering compartment 112 communicates with filter chamber 106 by means of one-way valve 118, thus allowing the flow or filtered water to enter into compartment 112 and be metered into adjacent mixing compartment 114 through metering means 120 disposed in partition 122, and also allowing controlled flow through orifice 124 which communicates with purifying chamber 126. Chamber 126 is provided with conduit member 128 which is positioned to communicate with mixing chamber 114 through orifice 130.

Accordingly, filtered water enters purifying chamber 126 and is super-saturated in iodine crystals 132. The iodine-saturated water is then forced to flow through conduit member 128 by way of holes 134, and up the neck member 135 into compartment 114, wherein filtered water passing through metering means 120 mixes with iodized water from chamber 126, thereby providing a correct proportional mixing. From mixing compartment 114, the filtered and purified water enters storage chamber 82 through valve 136 disposed therebetween.

Thus, one can always be assured of drinking water, even after the unit is disconnected from a water connection, as storage chamber 82 is capable of holding a sufficient quantity of filtered/purified water.

Still another embodiment is illustrated in FIGS. 8 through 10, wherein this unit is adapted for the in-line installation in which it will be permanently secured. Accordingly, the water filter and purifier is generally indicated at 140 having a housing including an inlet port 142 and an outlet port 144. The inlet port 142 opens directly into filter chamber 146 wherein a filter means is removably disposed therein.

It should be noted that FIG. 10 is schematically illustrated to show the basic principle of the present invention, so as to be adapted for permanent installation as heretofore mentioned.

Hence, filter chamber 146 is formed in housing 140 having a removable cap member 148 by which cartridge-type filters 150 can be readily replaced without displacement of the overall unit.

Water entering inlet port 142 passes into chamber 146 and from there passes through filter 150, discharging through opening 152 positioned between chamber 146 and metering compartment 154. Metering compartment 154 is provided with two valve means, 156 and 158, wherein valve means 156 is illustrated as being interposed between metering compartment 154 and a mixing compartment 160.

It should be understood that various known flow-control-valve means may be suitably adapted therein. However, for simplicity, valve 156 is shown having a rotatable body 164, including a passage 164 which is horizontally aligned with enlarged flow passage 166 which communicates between metering compartment 154 and mixing compartment 160. Thus, a controlled flow of filtered water is regulated therethrough by rotating valve body 162.

Control valve 158 is shown interposed between metering compartment 154 and purifying chamber 170, whereby filtered water is metered into chamber 170 by rotation of valve body 172. Water enters chamber 170 through channel 174 having a plurality of holes 176, at which time the water is saturated by iodine crystals 178 stored in purifying chamber 170. The iodized water then flows into an outlet channel 180 having a plurality of holes located in chamber 170, and a metering valve means 182 similar to valve 158. Valve 182 is positioned adjacent mixing compartment 160, whereby predetermined quantities of filtered and iodized water enter mixing compartment 160 through the regulation of the combined valve means 156, 158 and 182. Thus, an accurate control can be maintained wherein the discharging pure water will have an amount of germicidal between 0.80 ppm to 1.2 ppm.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

I claim:

1. A water-filtration-and-purification apparatus comprising:
   a housing having an inlet port on one side of the housing and an outlet port on an opposite side of the housing spaced apart from the inlet port;
   a first filtering chamber, a second metering compartment, and a third purifying chamber located within said housing between said inlet and said outlet;
   said first filtering chamber located within said housing in communication with said housing inlet, and outlet means in said first chamber in communication with said second metering compartment;
   means for filtering fluid arranged in said first filtering chamber between said inlet and outlet thereof;
   first metered fluid communication means between said second metering compartment and said third purifying chamber;
   second metered fluid communication means in said second metering compartment between said first fluid communication means and an outlet means from said second compartment;
   outlet means in said third purifying chamber in fluid communication with outlet means of said second metering compartment chamber and said second fluid communication means in said second metering compartment;
   water-purifying means located within said third chamber between said first metered fluid communication means and outlet means of said third chamber, and arranged for the passage of water from said first metered fluid communication means to pass through said water purifying means and be discharged from said outlet means of said third chamber into said second compartment; and
   means for fluid communication between said second metering compartment outlet and said housing outlet for the discharge of treated liquid from said housing.

2. An apparatus as recited in claim 1, wherein said second metering compartment includes a fourth mixing compartment disposed in said second compartment between said second metered fluid communication means and said outlet means from said second compartment, and having fluid communication with said outlet means in said third purifying chamber.

3. An apparatus as recited in claim 2, wherein said first and second metered fluid communication means and said outlet means in said third purifying chamber comprise an adjustable valve means.

4. An apparatus as recited in claim 3, wherein said adjustable valve means comprises a rotatable body member having passages disposed therethrough.

5. An apparatus as recited in claim 4, wherein said filter chamber includes a removable cap member whereby said filter means can be removed therefrom.

6. An apparatus as recited in claim 2, including:
   a first valve means positioned between said inlet port and said filter chamber, to allow water flow into said filter chamber;
   a second valve means positioned between said filter chamber and said metering compartment, to allow filtered water to pass from said filter chamber into said metering compartment; and
   a third valve means disposed between said mixing compartment and said outlet port, to allow discharge of the filtered and purified water.

7. An apparatus as recited in claim 6, wherein said valve means are one-way valves to provide water flow in one direction.

8. An apparatus as recited in claim 7, wherein said inlet port and outlet port include connecting means, whereby said apparatus is connected into a water-flow line so as to receive water therein and discharge water therefrom.

9. An apparatus as recited in claim 8, wherein said connecting means comprises a nipple member.

10. An apparatus as recited in claim 9, wherein said filter chamber includes a nozzle member arranged to discharge water into said filter means.

11. An apparatus as recited in claim 8, wherein said purifying chamber includes a conduit member to direct purified water into said mixing compartment.

12. An apparatus as recited in claim 11, wherein said apparatus includes a water-storage chamber interposed between said mixing chamber and said outlet port.

13. An apparatus as recited in claim 8, wherein said purifying means comprises a germicidal chemical.

14. An apparatus as recited in claim 13, wherein said germicidal chemical is consisted of iodine crystals.

* * * * *